UNITED STATES PATENT OFFICE.

RICHARD HURLEY, OF HOBOKEN, NEW JERSEY, ASSIGNOR TO JOHN C. FARR, JR., OF HOBOKEN, NEW JERSEY.

ELECTROLYTE.

1,138,221. Specification of Letters Patent. Patented May 4, 1915.

No Drawing. Application filed December 28, 1912. Serial No. 739,061.

*To all whom it may concern:*

Be it known that I, RICHARD HURLEY, a subject of the Crown of Great Britain, and resident of Hoboken, in the county of Hudson and State of New Jersey, have invented a new and useful Electrolyte, of which the following is a specification.

This invention relates to an electrolyte and more particularly to an electrolyte directed for use in the so called lead zinc storage batteries.

The object of the invention is to provide a compound of this character which will increase the life and efficiency of a battery and which may be made at a relatively small cost and in a form adapted to facilitate its transportation.

The invention, broadly considered, consists of a compound composed of precipitated lead zinc, acid and water, to which solution may or may not be added a percentage of a solution composed of mercury, nitric acid and zinc. In forming this compound I prefer to use in the first solution, lead precipitated by powdered zinc from acetate of lead, and sulfuric acid, and in the second solution metallic mercury, nitric acid, and sulfate of zinc crystals; all the chemicals in both solutions being chemically pure and the water being distilled.

More specifically considered, the invention consists in various combinations of these ingredients formed into compounds in certain manners and proportions as will be hereinafter set forth and included in the claims.

In forming the first solution, the procedure is as follows; proportions being given for the purpose of illustration:—Mix one ounce of acetate of lead in two pints of water until a milky solution is formed. To this solution add ten ounces of zinc dust, and stir the mixture until the lead has been precipitated, leaving a clear solution thereabove. The supernatant liquid is then poured off, and the precipitate dried and washed until there is no remaining acetate of lead. In carrying out the above steps some of the zinc will go into solution and the remainder will be deposited in the form of small particles mixed with the lead. The lead and zinc in the deposit will be in the form of metals. The amount of zinc which goes into solution will be approximately equivalent to the amount of acetate of lead which was in the milky solution. I am aware that lead is not soluble in dilute sulfuric acid, but the fact is that the precipitate which consists of the lead and zinc combined in metallic form is soluble in dilute sulfuric acid, and I attribute this solubility to an electrolytic action due to the difference in the potential of the lead and zinc. This precipitate is then dissolved in dilute sulfuric acid, of about twenty per cent. strength, and the mixture allowed to stand until the whole is converted into crystals. This conversion into crystals will ordinarily take about forty-eight hours at normal temperatures, but the operation can be hastened to approximately twenty-four hours by heating the mixture to say 200° F. The crystals are then dissolved in dilute sulfuric acid of about twenty per cent. strength, enough of the dilute acid being used to form, with the crystals, a saturated solution. I believe these crystals consist predominantly of some combination of lead sulfate and zinc sulfate. It is true that lead sulfate is not soluble in dilute sulfuric acid, but these crystals are, as a matter of fact, soluble in dilute sulfuric acid, and having been so dissolved, an electrolyte is formed which includes sulfate of lead, sulfate of zinc and sulfuric acid. The solution thus formed constitutes in itself an electrolyte having the features of advantage mentioned above. However, for certain purposes, I prefer to make the electrolyte by adding to the first solution, above described, a percentage of a second solution formed in the following manner; (proportions being given for purposes of illustration) : Dissolve one ounce of metallic mercury in six ounces of nitric acid, and add to this solution sulfate of zinc crystals until all the crystals are thoroughly saturated, forming a thick paste. This substance is deliquescent and will become liquid after being exposed to the atmosphere for about twenty-four hours. In adding this second solution to the first solution for forming the electrolyte, I preferably mix the two in substantially the proportions of one ounce of the second solution to a pint of the first. This modified form of my electrolyte also contains the advantageous features above mentioned and is better adapted for certain purposes in storage batteries than the first mentioned solution.

For purposes of transportation, the electrolyte consisting of the first solution may be converted into a dry state by adding to the solution an equal volume of sulfuric acid, which will cause the precipitation of a fine white powder. This powder may be transported in any desired manner and can be used as an electrolyte by merely dissolving it in sufficient water to form a saturated solution.

It will be understood that the exact proportions and methods of procedure may be varied without departing from the spirit and scope of my invention, and hence I do not wish to limit myself strictly to the ingredients, proportions and processes herein set forth, but

What I claim is:

1. A composite electrolyte comprising a salt of lead, a salt of zinc and an acid.

2. A composite electrolyte comprising sulfate of lead, sulfate of zinc and sulfuric acid.

3. A composite electrolyte comprising sulfate of lead, sulfate of zinc, sulfuric acid, and water.

In testimony, that I claim the foregoing as my invention, I have signed my name in presence of two witnesses, this twenty-first day of December 1912.

RICHARD HURLEY.

Witnesses:
F. GEORGE BARRY,
HENRY C. THIEME.